(12) United States Patent
Berger et al.

(10) Patent No.: US 9,598,033 B1
(45) Date of Patent: Mar. 21, 2017

(54) JOINING AND REINFORCING A COMPOSITE BUMPER BEAM AND A COMPOSITE CRUSH CAN FOR A VEHICLE

(71) Applicant: United States Council for Automotive Research, LLC, Southfield, MI (US)

(72) Inventors: Elisabeth Berger, Farmington Hills, MI (US); Leland Decker, Sterling Heights, MI (US); Dale Armstrong, Bloomfield Hills, MI (US); James Truskin, Plymouth, MI (US); Praveen Pasupuleti, Southfield, MI (US); Ramesh Dwarmpudi, Novi, MI (US); Mark Doroudian, Novi, MI (US)

(73) Assignee: UNITED STATES COUNCIL FOR AUTOMOTIVE RESEARCH, LLC, Southfield, MI (US)

( * ) Notice: Subject to any disclaimer, the term of this patent is extended or adjusted under 35 U.S.C. 154(b) by 0 days.

(21) Appl. No.: 14/935,722

(22) Filed: Nov. 9, 2015

(51) Int. Cl.
*B60R 19/00* (2006.01)
*B60R 19/03* (2006.01)
*B60R 19/34* (2006.01)

(52) U.S. Cl.
CPC ............. *B60R 19/03* (2013.01); *B60R 19/34* (2013.01)

(58) Field of Classification Search
CPC ................................ B60R 19/03; B60R 19/34
See application file for complete search history.

(56) References Cited

U.S. PATENT DOCUMENTS

| 7,434,872 | B2 | 10/2008 | Steller | |
|---|---|---|---|---|
| 8,684,427 | B2 | 4/2014 | Marur et al. | |
| 8,876,179 | B2 | 11/2014 | Nagwanshi et al. | |
| 2006/0181089 | A1 | 8/2006 | Andre et al. | |
| 2012/0104775 | A1* | 5/2012 | Marur | B60R 19/18 293/120 |
| 2014/0333077 | A1 | 11/2014 | Kil et al. | |
| 2014/0367981 | A1* | 12/2014 | Zaluzec | B60R 19/18 293/121 |
| 2015/0291114 | A1* | 10/2015 | Borde | B60R 19/023 293/122 |

FOREIGN PATENT DOCUMENTS

EP    2048407 A1    4/2009

* cited by examiner

*Primary Examiner* — Joseph D Pape
(74) *Attorney, Agent, or Firm* — Brooks Kushman P.C.

(57) ABSTRACT

A front bumper beam and crush can (FBCC) system is provided for a vehicle. A bumper beam has an interior surface with a plurality of ribs extending therefrom. The ribs and the interior surface are made of a chopped fiber composite and cooperate to engage a crush can. The chopped fiber composite reinforces the engaging surfaces of the crush can and the interior surface of the bumper beam. The crush can has a tubular body made of a continuous fiber composite. The crush can has outwardly-extending flanges at an end spaced away from the bumper beam. The flanges are at least partially provided with a layer of chopped fiber composite to reinforce a joint between the outwardly-extending flange and the vehicle frame.

20 Claims, 3 Drawing Sheets

JOINING AND REINFORCING A COMPOSITE BUMPER BEAM AND A COMPOSITE CRUSH CAN FOR A VEHICLE

STATEMENT REGARDING FEDERALLY SPONSORED RESEARCH OR DEVELOPMENT

The invention was made with Government support under Contract No. DE-EE0005661 awarded by the Department of Energy. The Government has certain rights to the invention.

TECHNICAL FIELD

This disclosure generally relates to a bumper beam and associated crush cans of a vehicle. More specifically, this disclosure relates to a composite bumper beam and composite crush cans with a chopped fiber composite in specific regions for reinforcement and strength.

BACKGROUND

Most vehicles are equipped with bumpers on the front and rear of the vehicle to protect the vehicle in the event of a collision. Decades of research and innovation have yielded improved bumper designs and associated structure to best protect the vehicle by absorbing high amounts of kinetic energy. By absorbing as much of the kinetic energy of the collision as possible, a bumper system reduces the peak deceleration of the vehicle which can help to reduce the likelihood and severity of damage to the vehicle and its occupants.

A typical bumper system includes a bumper beam attached to the forward portion of the vehicle frame. Energy-absorbing components, such as "crush cans," can be included to connect and maintain a spaced relationship between the bumper beam and the frame. These energy-absorbing components are generally designed to plastically deform or to undergo progressive crush under compression during a collision, bending or buckling to absorb the received kinetic energy.

SUMMARY

According to one embodiment, a front bumper beam and crush can (FBCC) system is provided for a vehicle. A continuous fiber composite bumper beam has a longitudinal outer shell having a front member, a top member, and a bottom member that collectively define a convex outer surface and a concave inner surface. A plurality of chopped fiber composite ribs extend from the inner surface along a length of the bumper beam. The ribs and the inner surface of the bumper beam cooperate to define a pocket having a first plurality of chopped fiber composite mating surfaces. A crush can has a continuous fiber composite tubular body that defines a second plurality of mating surfaces engaged with the first plurality of mating surfaces. The crush can has an inwardly-extending flange at a forward end of the tube that engages the inner surface of the bumper beam within the pocket, and an outwardly-extending flange at a rear end of the tubular body that engages a frame of the vehicle. The outwardly-extending flange includes a layer of a chopped fiber composite to reinforce a joint between the outwardly-extending flange and the vehicle frame.

In another embodiment, a front bumper beam for a vehicle includes a continuous fiber composite beam having an interior surface defining a channel. A plurality of chopped fiber composite ribs extend from and contact the interior surface. The ribs and the interior surface of the beam cooperate to define two pockets spaced apart from each other along a length of the beam. Each pocket is configured to receive a respective crush can to connect the beam to a frame of the vehicle. A number of the ribs define a plurality of chopped fiber composite engagement surfaces at a perimeter of the pocket. The chopped fiber composite engagement surfaces are configured to engage with corresponding side surfaces of the crush can in a face-to-face relationship.

In yet another embodiment, a vehicle bumper crush can has a continuous fiber composite main body including a longitudinal portion having first and second ends, a pair of outwardly extending flanges extending outwardly from the first end and each having a surface facing away from the longitudinal portion, and a pair of inwardly extending flanges extending inwardly from the second end. A chopped fiber composite layer overlays and contacts at least a portion of each of the surfaces of the outwardly extending flanges.

DETAILED DESCRIPTION

Figure 1:
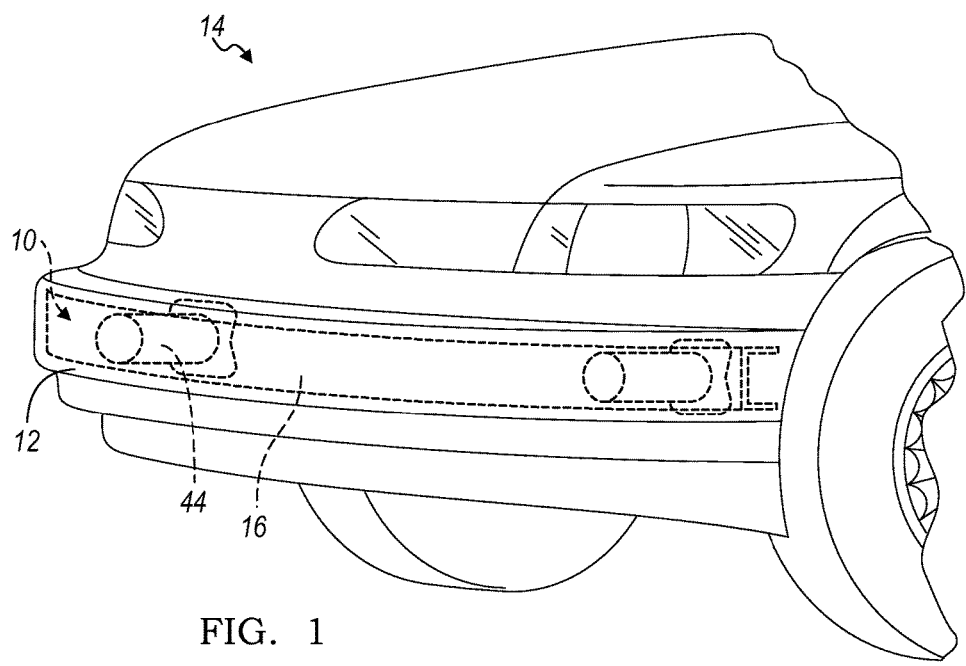
FIG. 1 is a front perspective view of a vehicle having a bumper beam and a pair of crush cans that will be described below, according to various embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It should be understood that directional terms used herein are intended for illustrative purposes only. For example, the terms "inward" or "outward" may refer to the direction with respect to the center of the vehicle. As another example, the terms "vertical," "horizontal," "upper," and "lower" are intended to give context of a specific component with respect to a normally-oriented vehicle to which the bumper beam and crush can system can be attached to. Such directional terms are intended to give relative locational context between various components, and are not meant to be limited to being only located or oriented as such.

According to various aspects of the present disclosure, a composite front bumper beam and crush can (FBCC) system has been developed. The FBCC system includes a bumper beam, as well as one or more crush cans extending inward from the bumper beam. These components will be described in detail below.

The FBCC system disclosed herein can be used in any location in a vehicle, but in a preferred embodiment the FBCC is for a front bumper of the vehicle. In other embodiments, the FBCC system is used for the rear bumper or sides of the vehicle.

Bumper beams disclosed herein are provided generally to reduce or eliminate the damage to vehicle components located inward from the bumper beam such as, for example, engine components or other powertrain components. The FBCC is designed to absorb and transfer force from an impact so as to reduce or eliminate harm done to these components as well as occupants within the vehicle.

Due to the high amounts of energy transferred through the bumper system during a high-speed collision, the bumper beams and energy-absorbing components have traditionally been made from steel or aluminum. There are various ways of joining the metallic beams and crush cans to each other and to the frame of the vehicle. They can be welded or bolted together, for example.

Figure 2:
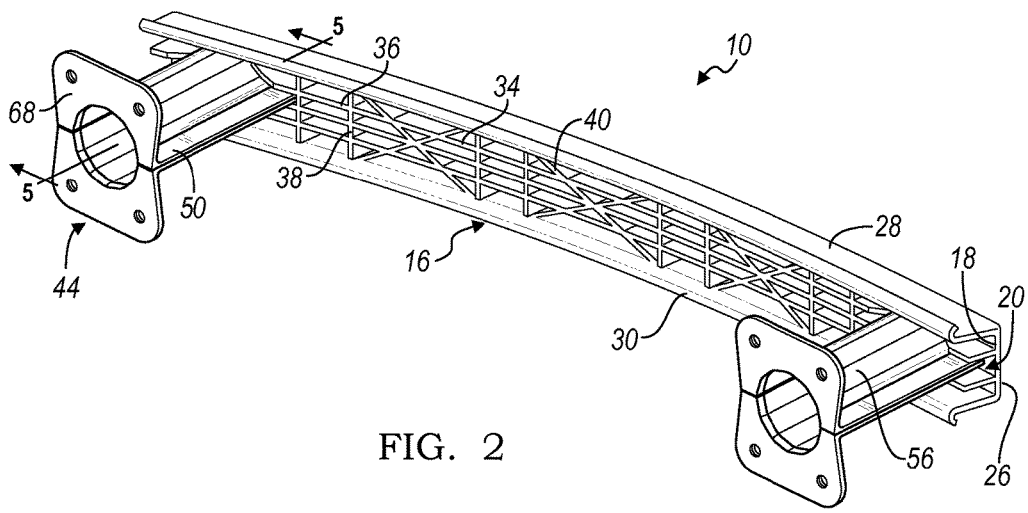
FIG. 2 is a rear perspective view of an automotive bumper beam and a pair of attached crush cans, according to one embodiment.
Figure 3:
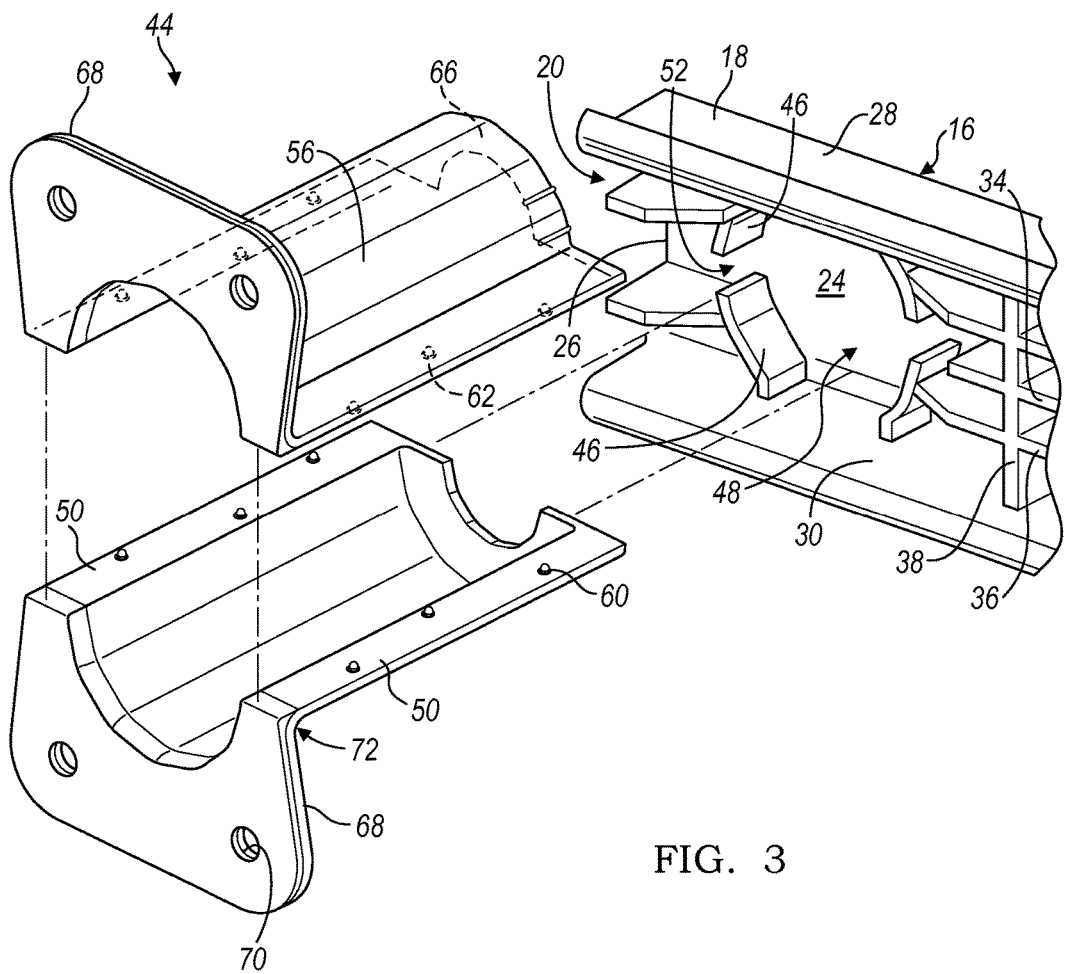
FIG. 3 is a rear perspective view of two halves of a crush can prior to assembly together, and prior to assembly to the bumper beam, according to one embodiment.
Figure 4:
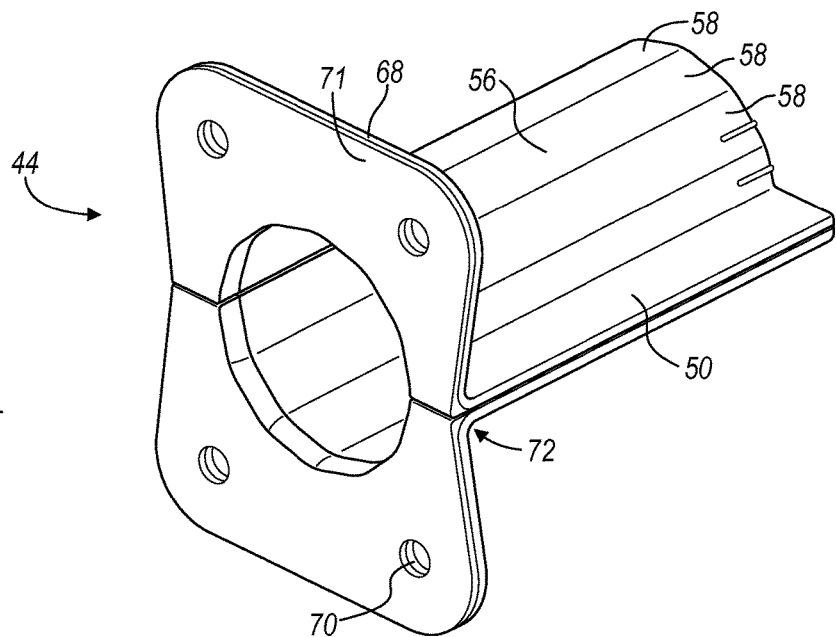
FIG. 4 is a rear perspective view of one of the crush cans in isolation.
Figure 5:
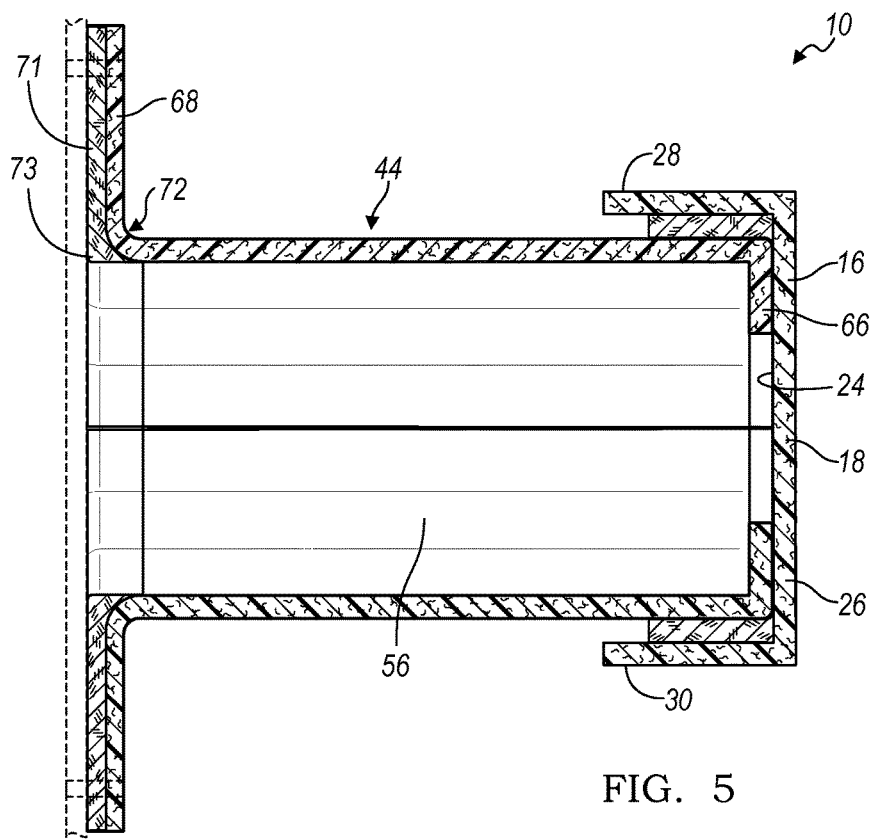
FIG. 5 is a cross-sectional view of one of the crush cans mounted to a vehicle frame at one end and secured within a pocket of the bumper beam at another end.

The FBCC system 10 is generally illustrated in FIG. 1 as being mounted behind a front bumper panel 12 (or front fascia) of a vehicle 14. The FBCC system is shown in isolation in FIG. 2, while additional views of the various components of the FBCC system 10 are shown in FIGS. 3-5. Description is provided below with respect to all of these figures, which are meant to be illustrative and non-limiting examples of the invention of this disclosure.

With reference to these figures, the FBCC is generally shown at 10. A bumper beam 16 extends along an arcuate length and has a general C-shaped cross-section. In one embodiment, the outward-most portion, or outer shell 18, of the bumper beam defines a C-shaped, convex channel 20 within an inner surface 24 of the outer shell 18 of the bumper beam. The outer shell 18 can include a front member 26 extending generally vertical, as well as a top member 28 and a bottom member 30 that each extend generally transverse to the front member. Each of the front, top, and bottom members 26, 28, 30 has respective inner surfaces that provide the C-shaped channel 20 therein.

It should be understood that while the channel 20 is generally referred to as being C-shaped, this is intended to be a general characterization of one embodiment of the shape of the channel 20. The channel 20 can be any shape that gives it a convex nature for ribs to be formed therein.

This outer shell 18 can be made up of a continuous fiber composite, such as carbon fiber or glass. In an alternative embodiment, the fiber composite is a discontinuous fiber composite. A plurality of ribs 34 extend inward from the inner surface 24. The ribs 34 include longitudinal, generally horizontal ribs 36 that along the length of the bumper beam, as well as generally vertical ribs 38 extending transverse to the horizontal ribs 36. The ribs 34 may also include a plurality of X-shaped ribs 40 in portions to provide additional support. Other configurations of the ribs 34 are contemplated and can be arranged to best support the outer shell 18 according to various specifications.

As opposed to the continuous fiber composite material of the outer shell 18 of the bumper beam 16 described above, the ribs 34 can be made of a chopped fiber composite such as, for example, sheet molding compound (SMC). The chopped fiber composite ribs provide an increased strength for support of the structure of the bumper beam 16.

In one embodiment, the ribs 34 are co-molded into the inner surface 24 of the C-shaped channel 20. Once cured, the chopped fiber composite nature of the ribs 34 provides increased stiffness and structural support than if the ribs were a continuous fiber composite. And, because the ribs 34 are co-molded with the continuous fiber composite of the C-shaped channel 20, the ribs 34 and C-shaped channel 20 can be formed generally simultaneously, before either has cured, reducing costs and time associated with additional forming steps, while still having two separate materials in the bumper.

Crush cans 44 (that will be further described in detail below) are joined to the inner surfaces 24 of the outer shell 18. To engage and attach to end portions of the crush cans 44, the ribs 34 can be molded to take the shape of the crush cans 44. For example, as shown in the embodiments of FIGS. 3-5, the ribs end at crush-can-attachment surfaces 46 that also extend out from the inner surface of the front member 26 of the C-shaped channel. These crush-can-attachment surfaces 46 are shaped to form locating pockets 48 for the crush cans 44; they are sized and shaped to engage in a face-to-face relationship with corresponding exterior surfaces of the crush can. As best shown in FIG. 3, the ribs 34 may taper toward the crush-can-attachment surfaces 46 such that the majority of the ribs 34 extend further away from the inner surface 24 of the front member 26 than the crush-can-attachment surfaces 46 do.

In one embodiment best seen in FIG. 3, there is no additionally-formed crush-can-attachment surface at the top and bottom of the locating pocket 48. In other words, the inner surfaces of the top member 28 and the bottom member 30 of the C-shaped channel 20 serve as an engagement surface for engaging directly with the crush can 44. In a different embodiment not shown, a separate crush-can-attachment surface is formed co-planar with the inner surfaces of the top member 28 and bottom member 30, mated thereto in a face-to-face relationship. And, to accommodate the flanges 50 extending radially outward from the body of the crush can (as will be described below), a gap 52 can be provided in the crush-can-attachment surfaces 46. Above and below this gap 52, additional crush-can-attachment surfaces can mate in a face-to-face relationship with the flanges 50 of the crush can 44.

As is the case with the ribs 34, all of the crush-can-attachment surfaces 46 can be co-molded with the chopped fiber composite to provide stiffness and strength in the areas where the crush cans 44 attach. And, the inner surfaces 24 of the C-shaped channel 20 can be co-molded with the chopped fiber in locations where the crush cans 44 attach.

An example of one pre-assembled crush can 44 is best shown in FIG. 3, and an assembled crush can 44 is shown in FIG. 4. The crush cans 44 can be two halves bonded together along longitudinally-extending flanges 50 that extend along the length of the crush can (as will be described below). While the figures illustrate the crush cans 44 as being two halves joined together, other embodiments contemplate a single crush can being made of a single mold and not of two halves. And, it should be understood that while the term "half" or "halves" is used, it is not intended that the halves be identical or symmetrical.

The crush can 44 has an elongate tubular body 56 with a hollow interior extending along a central longitudinal axis. A cross-section of the hollow tubular body 56 can take the shape of a dodecagon having twelve sides. With this shape, it follows that the tubular body 56 has twelve exterior, generally planar surfaces 58. It should be understood that a dodecagon shape is exemplary, and any number of sides can be used to engage with the bumper beam 16. Having twelve planar surfaces 58 gives a particular benefit in that the relatively high number of exterior surfaces allows a force from a collision to distribute along an equal number of surface paths, absorbing the force and reducing its impact on the vehicular components. And, bonding in an increased number of planes provides an improved bond design compared to only four of six sides, for example. More or less than twelve exterior surfaces 58 can be used in other embodiments.

These exterior surfaces 58 engage with the crush-can-attachment surfaces 46 of the bumper beam 16, explained above. The twelve exterior surfaces 58 can then be bonded to the corresponding crush-can-attachment surfaces 46, with the co-molded chopped fiber of the crush-can-attachment surfaces 46 providing additional strength.

A pair of longitudinal flanges 50 flank either side of the exterior of the tubular body 56 of the crush can 44. These flanges 50 extend away from the exterior surfaces 58 and along the length of the tubular body 56. In an embodiment in which each crush can is made of two halves, as explained above, the flanges 50 provide bonding surfaces such that each half of the crush can 44 is bonded to its other half along the mated flanges 50. An adhesive, such as urethane, epoxy or methyl methacrylate, can be used between the two flanges to bond the two crush can halves together. In other embodiments, vibrational welding or ultrasonic welding can be used to join the two flanges 50. Bolting or riveting may also be used for joining the two halves of the crush can, either in isolation or in combination with the bonding or welding. Other methods of joining can be implemented as known to one of skill in the art, depending upon the particular makeup of the components used. This same adhesive or method of joining can also be provided on the attachment surfaces 46 of the locating pockets 48 to provide adhesion between the crush can 44 and the bumper beam 16.

As shown in FIG. 3, one half of the crush can may be provided with one or more locating features such as protrusions 60 that extend into corresponding receptacles 62 in the other crush can half. The locating features allow the two crush can halves to be properly aligned with one another while the adhesive on the flanges 50 cures.

After the crush can halves are assembled, the crush can 44 is joined to the bumper beam 12. The flanges 50 extend though the gaps 52 in the crush-can-attachment surfaces 46 within the C-shaped channel 20 of the bumper beam 16. The flanges 50 can be bonded in a face-to-face relationship with the longitudinally-extending ribs 36.

At a front end of the crush can, a front bonding flange 66 extends radially inwardly from the tubular body 56. This front bonding flange 66 provides a front face that, when assembled to the bumper beam 16, engages the inner surface of the front member 26 outer shell 18 in a face-to-face relationship. The front bonding flange 66 provides additional surface area for the crush can 44 to attach to the front member 26 of the bumper beam 16, providing increased rigidity of the crush can 44 for absorbing a collision force.

At a rear end of the crush can, a pair of opposing rear attachment flanges 68 extend radially outwardly from the tubular body 56. These rear attachment flanges 68 provide generally planar surfaces to mount to the frame of the vehicle (not shown). A plurality of apertures 70 are provided to receive fasteners for mounting the crush can 44 to the vehicle frame.

As best seen in FIGS. 4 and 5, two layers of different material may be present in specific regions of the crush can 44. For example, the tubular body 56 of the crush can 44, the longitudinal flanges 50 on either side of the tubular body 56, and the front attachment flange 66 can be made of a continuous, woven fiber composite such as carbon fiber or glass. A layer 71 of a chopped fiber composite, such as SMC, can be co-molded or over-molded onto the rear attachment flanges 68. The chopped fiber composite can be co-molded to one (front or rear) side of the rear attachment flanges 68 (e.g., the side of the rear attachment flanges 68 that mounts to the vehicle frame). In another embodiment, the chopped fiber composite can be co-molded in only areas surrounding the apertures 70 that receive the fasteners for mounting the crush can to the vehicle frame to provide additional strength around this point. The chopped fiber composite strengthens the flange 68 in the area of the apertures 70 while eliminating the need for pieces of a prepreg material and the precision that inherently accompanies the assembly of such prepreg material.

The layer 71 of chopped fiber composite covers the bonding surface of the rear attachment flange 68 and extends over the curved radii 72 located between the rear attachment flange 68 and the two flanges 50 that extend along the longitudinal axis of the tubular body 56 of the crush can 44. In other words, the chopped fiber composite layer 71 is not only layered on the rear attachment flange 68, but also extends at least partially between upper and lower halves of the crush can between the longitudinally-extending flanges 50 over the curved radii 72. This increases the bonding of the chopped fiber composite to the continuous woven fiber composite making up the remainder of the crush can 44. This also strengthens the transitional area between two transverse flanges 50 in which a large amount of the collision force is likely to be realized. In one embodiment, the chopped fiber composite does not extend along the entire length of the flanges 50, as shown in FIGS. 3-5.

The co-molded layer 71 of chopped fiber also enables a sharper corner 73 to exist between the rear attachment flanges 68 and the longitudinal flanges 50, on the rearward-facing side of the curved radii 72. The material properties of a woven, continuous fiber, such as carbon fiber, make it difficult for the crush can 44 to be formed with relatively sharp corners at the intersection of two transverse flanges 50, 68. The material of the continuous fiber tends to require a generally-equal thickness throughout the corner. The chopped fiber composite, on the other hand, is better suited to mold and conform to a desired shape. Therefore, the chopped fiber composite allows a sharper angle to be possible at the curved radii 72 between the rear attachment flanges 68 and the longitudinal flanges 50. A relatively sharp angle shown at 73 at the intersection of the flanges 50, 68 allows the top and bottom halves of the crush can 44 to assemble to one another while their respective rear attachment flanges 68 align in a flat plane with two corners butting against one another. In other words, the chopped fiber composite allows the top and bottom rear attachment flanges 68 of one crush can 44 to meet and form a surface that is more contiguous and unbroken than if only a continuous fiber composite were used. The result of using a chopped fiber composite at this corner is that the convex side of this corner can have a sharper curvature than the concave, exposed side of this corner, and a slightly longer bonding surface. In one embodiment, an intersection of one of the longitudinally-extending, tube joining flanges 50 and one of the outwardly extending flanges 68 defines a bevel surface, and the chopped fiber composite layer 71 overlays and contacts the bevel surface. In another embodiment, an intersection of one of the longitudinally-extending, tube joining flanges 50 and one of the outwardly extending flanges 68 defines a curved surface on a frame-facing side of the continuous fiber, and the chopped fiber composite layer 71 overlays and contacts the curved surface. The layer of chopped fiber composite 71 overlays the bevel or curved surface and includes a sharper angle than that of the bevel or curved surface.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A front bumper beam and crush can (FBCC) system for a vehicle, the FBCC system comprising:
   a continuous fiber composite bumper beam having a longitudinal outer shell having a front member, a top member, and a bottom member that collectively define a convex outer surface and a concave inner surface;
   a plurality of chopped fiber composite ribs extending from the inner surface along a length of the bumper beam, wherein the ribs and the inner surface of the bumper beam cooperate to define a pocket having a first plurality of chopped fiber composite mating surfaces; and
   a crush can having a continuous fiber composite tubular body that defines a second plurality of mating surfaces engaged with the first plurality of mating surfaces, wherein the crush can has an inwardly-extending flange at a forward end of the tubular body that engages the inner surface of the bumper beam within the pocket, and an outwardly-extending flange at a rear end of the tubular body that engages a frame of the vehicle, the outwardly-extending flange including a layer of a chopped fiber composite to reinforce a joint between the outwardly-extending flange and the vehicle frame.

2. The FBCC system of claim 1, wherein the crush can further includes a longitudinal flange extending along a length of the tubular body.

3. The FBCC system of claim 2, wherein the outwardly-extending flange and the longitudinal flange intersect to define first and second curved surfaces on opposing sides of the intersecting flanges, wherein the first curved surface has a sharper radius of curvature than the second curved surface.

4. The FBCC system of claim 3, wherein the outwardly-extending flange includes a rearward-facing surface facing the frame of the vehicle, wherein the layer of chopped fiber composite covers at least a portion of the rearward-facing surface and extends over at least a portion of the first curved surface.

5. The FBCC system of claim 1, wherein the tubular body is a two-piece split tubular body joined at a pair of mating longitudinal flanges that extend along a length of the tubular body.

6. The FBCC system of claim 5, further comprising an adhesive between the pair of mating longitudinal flanges to adhere the split tubular body.

7. The FBCC system of claim 1, wherein the continuous fiber composite of the second plurality of mating surfaces of the tubular body engages with the chopped fiber composite of the first plurality of mating surfaces of the pocket of the bumper beam.

8. The FBCC system of claim 1, wherein a portion of the top member and the bottom member of the shell of the beam partially define the pocket.

9. A front bumper beam for a vehicle, comprising:
   a continuous fiber composite beam having an interior surface defining a channel; and
   a plurality of chopped fiber composite ribs extending from and contacting the interior surface;
   wherein the ribs and the interior surface of the beam cooperate to define two pockets spaced apart from each other along a length of the beam, each pocket configured to receive a respective crush can to connect the beam to a frame of the vehicle, wherein a number of the ribs define a plurality of chopped fiber composite engagement surfaces at a perimeter of each of the pockets and configured to engage with corresponding side surfaces of the respective crush can in a face-to-face relationship.

10. The front bumper beam of claim 9, wherein the chopped fiber composite is a sheet molding compound (SMC).

11. The front bumper beam of claim 9, wherein the interior surface within the perimeter of each pocket is substantially planar to engage with a corresponding planar surface of the crush can.

12. The front bumper beam of claim 9, wherein the beam includes a top member, a bottom member, and a front member connecting the top and bottom members, wherein the top and bottom members extend further away from the front member than do the ribs.

13. The front bumper beam of claim 9, wherein each pocket defines a gap between two adjacent engagement surfaces, the gap configured to receive a flange of the crush can.

14. A vehicle bumper crush can comprising:
   a continuous fiber composite main body including a longitudinal portion having first and second ends, a pair of outwardly extending flanges extending outwardly from the first end and each having a surface facing away from the longitudinal portion, and a pair of inwardly extending flanges extending inwardly from the second end; and
   a chopped fiber composite layer overlaying and contacting at least a portion of each of the surfaces of the outwardly extending flanges.

15. The vehicle bumper crush can of claim 14, wherein the main body includes two separate halves joined together along two tube joining flanges extending along the length of the tube between the first and second ends.

16. The vehicle bumper crush can of claim 15, wherein the chopped fiber composite layer extends from the surfaces of the outwardly extending flanges and partially into a region between the two tube joining flanges.

17. The vehicle bumper crush can of claim 15, wherein an intersection of one of the tube joining flanges and one of the outwardly extending flanges defines a curved surface, and the chopped fiber composite layer overlays and contacts the curved surface.

18. The vehicle bumper crush can of claim 16, wherein the chopped fiber composite layer extends only partially along the length of the tube between the two tube joining flanges.

19. The vehicle bumper crush can of claim 15, wherein one of the tube joining flanges and one of the outwardly extending flanges intersect to define first and second curved surfaces on opposing sides of the intersecting flanges, and wherein the first curved surface is provided with the chopped-fiber composite and the second curved surface is not provided with the chopped-fiber composite.

20. The vehicle bumper crush can of claim 18, wherein the first curved surface has a sharper radius of curvature than the second curved surface.

\* \* \* \* \*